United States Patent
Wang et al.

(10) Patent No.: US 6,396,585 B1
(45) Date of Patent: May 28, 2002

(54) METHOD FOR MEASUREMENT AND VERIFICATION OF THE OPTIMUM OPTICAL PATH FOR RING LASER GYROSCOPE

(75) Inventors: Hsueh-Ming Steve Wang, Taipei; Mi-Hsiang Wen, Tao Yuan; Lung-Yung Lin, Hsin Chu, all of (TW)

(73) Assignee: Chung Shan Institute of Science and Technology, Tao Yuan (TW)

( * ) Notice: Subject to any disclaimer, the term of this patent is extended or adjusted under 35 U.S.C. 154(b) by 155 days.

(21) Appl. No.: 09/593,053

(22) Filed: Jun. 13, 2000

(51) Int. Cl.$^7$ ................................................ G01C 19/64
(52) U.S. Cl. ........................................ 356/459; 372/94
(58) Field of Search ............................... 356/459, 138, 356/147, 153, 601; 372/94

(56) References Cited

U.S. PATENT DOCUMENTS

| | | | |
|---|---|---|---|
| 4,884,283 A | * 11/1989 | Rahn et al. | 372/94 |
| 5,027,367 A | * 6/1991 | Rea et al. | 372/94 |
| 5,960,025 A | * 9/1999 | Thorland et al. | 372/107 |
| 6,310,904 B1 | * 10/2001 | Thorland et al. | 372/94 |

* cited by examiner

*Primary Examiner*—Samuel A. Turner
(74) *Attorney, Agent, or Firm*—Rosenberg, Klein & Lee

(57) ABSTRACT

In order to develop a production type of ring laser gyroscope (RLG), the determination of a laser plane for the assembly of the optical mirrors in a RLG block is needed. The new methods for measuring RLG cavities and for calculating the accuracy of the laser plane are developed. The optimum reflecting points and the error tolerances of the laser beams are obtained by using these methods. The advantages of these new methods are that both the design accuracy and the production time of the RLG block can be reduced as well as the yield rate of RLG could increase.

1 Claim, 2 Drawing Sheets

METHOD FOR MEASUREMENT AND VERIFICATION OF THE OPTIMUM OPTICAL PATH FOR RING LASER GYROSCOPE

The present invention relates to a method for measurement and verification of the optimum optical path for ring laser gyroscope, by using this method, the optimum optical path could be simply determined; the advantages of these new methods can be utilized to improve the design accuracy and to reduce manufacture cycle time of the RLG block. Also the yield rate of RLG could increase.

A laser gyroscope serves to as a guidance to offer a directional reference by calculating the phase difference of a laser light traveling in a three dimensional space.

Accordingly, the primary object of the present invention is to provide a method for determining the relative accuracy between a laser beam and a laser cavity. Based on the optic accuracy and accuracy of mechanical finishing, the measurement of the geometric shape, reference coordinates (x, y, z) of optic traveling path, and an optimal reference path of optic traveling path in three dimensional space can be calculated. The method comprises the following steps:

determining positional relation of the measuring points, a reference coordinate of optic traveling path can be determined from three known planes, all positions in the optic cavity can be measured according to this coordinate;

selecting sufficient measuring points for representing the geometrical accuracy of the optic cavity. After calculating errors, a normal distribution of the measurement data can be determined by its deviation, the number of sampling points being determined from a student distribution;

calculating optimum optic traveling paths from about measurement results. In order to avoid the possible errors in calculation, the equations for the optimum optic traveling paths are determined by least square method, from these equations, the optic traveling paths with respect to the coordinate are determined.

The various objects and advantages of the present invention will be more readily understood from the following detailed description as referring to the appended drawing.

Figure 1:
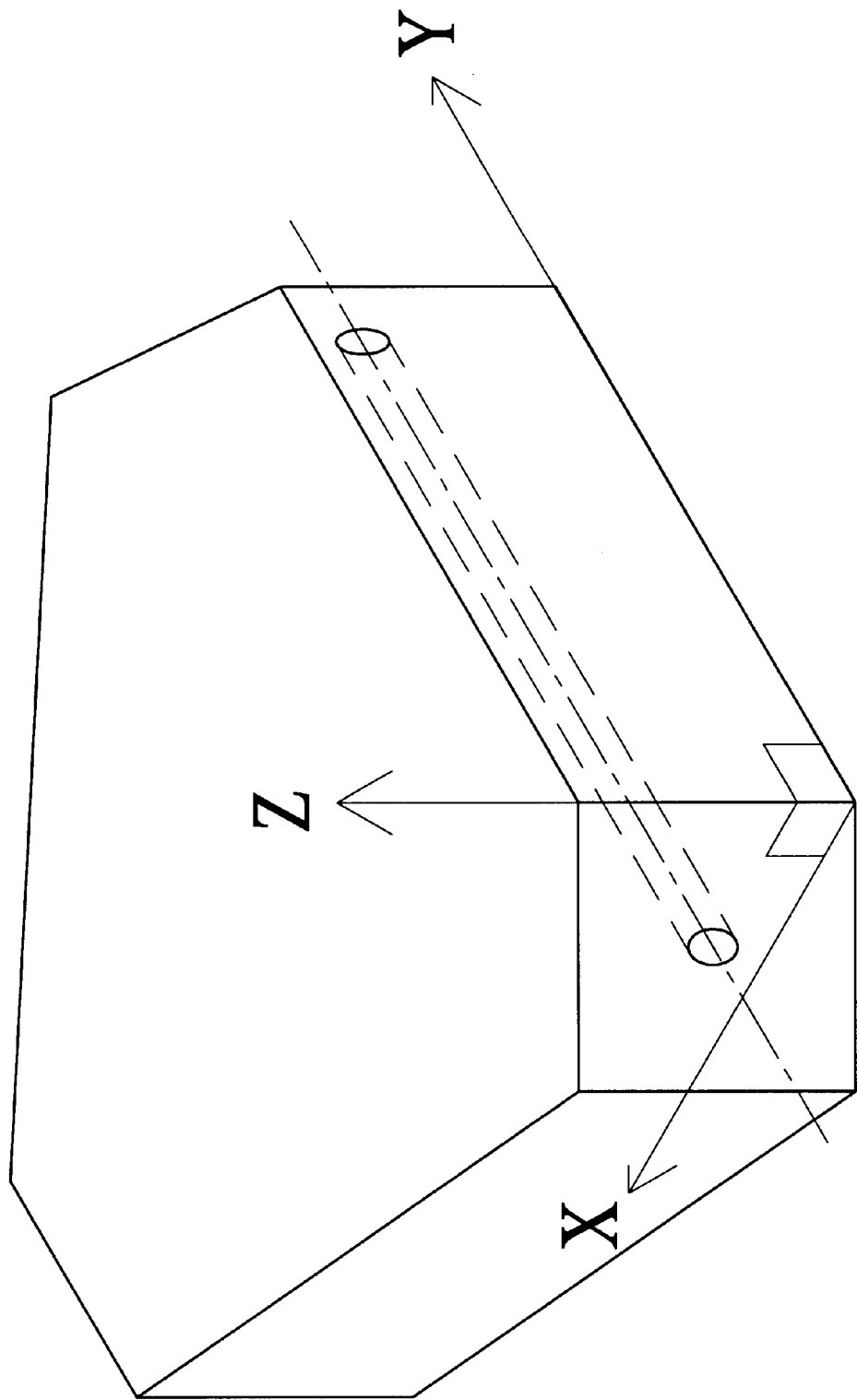
FIG. 1 shows the determination of coordinate axes and original point from the three known planes.
Figure 2:
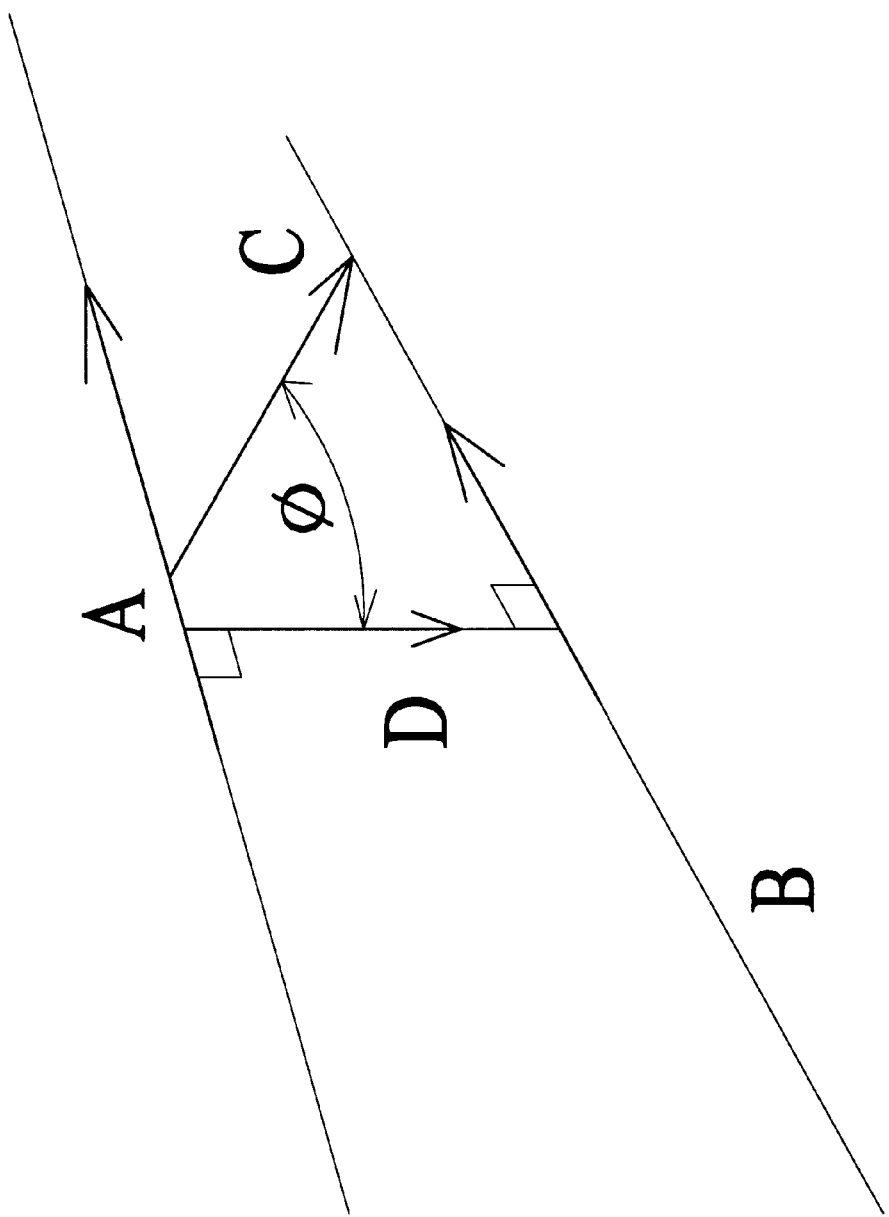
FIG. 2 shows the relation of vectors in the present invention.

THE CALCULATION OF THE TRIANGULAR PLANE IN A THREE DIMENSIONAL SPACE FOR A LASER BLOCK

The virtual triangular plane, which defines the path of laser beam in the three-dimensional space in a laser gyroscope block, decides the assembly tolerance of the mirrors. If both the intersection tolerance of the centerline of the laser cavity and the shape of the triangle are determined, then the positions for mounting mirrors are founds. The following paragraphs illustrate the linear regression method that can determine the centerline of the cavities.

Linear Regression

In order to determine and the exact laser triangular plane, we need to decide each single laser beam path from a three-dimensional cavity of a laser block. A three-dimensional cavity of the laser block can be calculated from two two-dimensional cavity profiles based on the different reference place if we can obtain these profiles through inspection methods. A two-dimensional laser beam path depends on the coordinate data, that is, x and y, after inspection. Suppose that the two-dimensional laser beam path would be a straight line, and that the observation y at each level of x is a random variable. The set of data is obtained from the inspection of cavity wall through a microscope. Now, the expected value of y for each value of x is $$E(x|y)=\beta_0+\beta_1 x$$

Where the parameters of the straight line $\beta_0$ and $\beta_1$ are unknown constants. We assume that each observation y can be described by the model $$y=\beta_0+\beta_1 x+\epsilon$$

Where $\epsilon$ is a random error with mean zero and variance $\sigma^2$. The $\{\epsilon\}$ are also assumed to be uncorrelated random variables.

If we have n pairs of inspection data $(x_1, y_1)$, $(x_2, y_2), \ldots, (x_n, y_n)$, we may estimate the model parameters $\beta_0$ and $\beta_1$ by least squares as follows:

$$y_j=\beta_0+\beta_1 x_j+\epsilon, j=1,2,\ldots,n$$

and the least squares function is $$L = \sum_{j=1}^{n} \varepsilon_j^2 = \sum_{j=1}^{n} (y_j - \beta_0 + \beta_1 x_j)^2 \qquad (4)$$

Minimizing the least squares function is simplified if we rewrite the model as $$y=\beta_0+\beta_1(x-x^-)+\epsilon$$

$$L = \sum_{j=1}^{n} [y_i - \beta_0' - \beta_1(x - x')]^2$$

$$\bar{x} = \frac{1}{n}\sum_{j=1}^{n} x_i$$

The least square estimators must satisfy $$\frac{\partial L}{\partial \beta_0'} = 0 \qquad (6)$$

$$\frac{\partial L}{\partial \beta_1} = 0$$

After solving these equations, we can obtain the least squares estimators of the intercept and slope as follows:

$$\beta_1'' = \frac{\sum_{j=1}^{n} x_j y_j - \sum_{j=1}^{n} x_j \sum_{j=1}^{n} y_j / n}{\sum_{j=1}^{n} x_j^2 - \left(\sum_{j=1}^{n} x_j\right)^2 / n} \qquad (7)$$

Therefore the best central line of a laser beam in a cavity for x and y dimensions can be determined by the estimation equation:

$$y=\beta''_0+\beta''_1 x \qquad (8)$$

Using the same method, we can obtain the same best central line of a laser beam in a cavity for x and z dimensions by the estimation equation:

$$z = \alpha''_0 + \alpha''_1 x \tag{9}$$

Therefore, the best central line of a laser beam in a cavity for x, y, and z dimensions is the intersection of the two planes that are represented by the above two equations. Utilizing the same process, the other two best central lines of the laser beam can also be determined.

The next step for the construction of a vertical triangle is to determine the intersection angle of each two lines. If there is no intersection between two lines, we need to calculate the offset value of these two lines. The following processes calculate the intersection angle of two lines, then, the offset value.

In order to decide the intersection angle, any two points in each line are selected to make a vector for each line, say, $\tilde{a}$ and $\tilde{u}$. Then, the intersection angle can be obtained by the following equation.

$$\theta = \cos^{-1} \frac{\tilde{a} \cdot \tilde{u}}{|\tilde{a}| \times |\tilde{u}|} \tag{10}$$

If two lines are not intersected, the offset value can be determined by the following procedure. First of all, find the vectors A, B, C which separately represent a vector of the first line, a vector of the second line, and a vector that starts from the first line and points to the second line. Then, the vector, D, that belongs to the offset line can be obtained by resolving the following equations.

A·D=0

B·D=0

D x (A x B)=0

The offset value of equal to cosφ×|C|

φ=cos⁻¹(C·D)/(|C|×|D|)

The relationships of these vectors are shown in the following graph. The above procedures define the intersection angle of two cavities and the offset value of the two cavities for those that have no intersection point with each other. Repeating these procedures, we can define a laser triangular plane in a three dimensional space. Based on this virtual triangular plane, we can define the geometrical reference that may be an edge of the laser gyroscope block or a virtual center of the triangular plane.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

We claim:

1. A method for determining the relation between a laser beam and a laser cavity based on the optic accuracy and accuracy of mechanical finishing, measuring the geometric shape of a cavity, and defining a reference coordinate (x, y, z) of the optic traveling path and an optimal reference path of optic traveling path in three dimensional space of the cavity, comprising the following steps:

determining positional relations of the measuring points, reference coordinates of optic traveling path being determined from three known planes, all positions in the optic cavity being measured according to this coordinate;

selecting sufficient measuring points for representing the geometrical accuracy of the optic cavity, through error analysis, a normal distribution of the measurement being determined by the errors, the number of sampling points being determined from a student distribution;

calculating the optimum optic traveling paths from above measurement results, in order to avoid probable errors in calculation, the equations for the optimum optic traveling paths being determined by the least square method, from these equations, the space of optic traveling paths with respect to the coordinate being determined, for each optic traveling path, for each x value, the expecting value of y is:

$$E(y|x) = \beta_0 + \beta_1 x$$

similarly, for each x value, the expecting value of z is:

$$E(z|x) = \alpha_0 + \alpha_1 x$$

thus, expect optic traveling path can be derived from E(y|x) and E(z|y).

* * * * *